United States Patent [19]

Ohnuki et al.

[11] Patent Number: 4,972,221
[45] Date of Patent: Nov. 20, 1990

[54] CAMERA HAVING AN AUTOMATIC FOCUS ADJUSTING APPARATUS

[75] Inventors: Ichiro Ohnuki, Kawasaki; Akira Akashi, Yokohama; Terutake Kadohara, Yokohama; Masaki Higashihara, Yokohama, all of Japan

[73] Assignee: Canon Kabushiki Kaisha, Tokyo, Japan

[21] Appl. No.: 292,567

[22] Filed: Dec. 30, 1988

[30] Foreign Application Priority Data

Jan. 6, 1988 [JP] Japan .................................. 63-001530

[51] Int. Cl.⁵ .............................................. G03B 13/36
[52] U.S. Cl. .................................. 354/402; 354/195.1; 354/400
[58] Field of Search ....................... 354/402, 400, 195.1

[56] References Cited
U.S. PATENT DOCUMENTS

| | | |
|---|---|---|
| 4,762,986 | 8/1988 | Suda et al. |
| 4,783,677 | 11/1988 | Hamada et al. ........................ 354/402 |
| 4,786,932 | 11/1988 | Akashi .................................. 354/402 |
| 4,792,819 | 12/1988 | Akashi .................................. 354/402 |
| 4,792,821 | 12/1988 | Akashi .................................. 354/402 |
| 4,816,856 | 3/1989 | Hamada et al. ........................ 354/402 |

Primary Examiner—Russell E. Adams
Attorney, Agent, or Firm—Fitzpatrick, Cella, Harper & Scinto

[57] ABSTRACT

A camera including an imaging optical system and a focus detecting circuit for repeatedly performing a focus detection operation and outputting a focus signal representing the focusing state of the optical system at the time of each focus detection operation. A calculation circuit predicts, on the basis of previous and latest focus signals, the focusing state of the optical system a predetermined period of time after the detection of the latest focus signal. The predetermined period of time includes a shutter release time-lag. A driving circuit drives the optical system by an amount corresponding to the focusing state calculated by the calculation circuit. A releasing circuit begins a film exposure in response to the operation of a shutter release member. A release timing control circuit controls the releasing circuit so that it does not operate until a point of time which is earlier, by an amount equal to the release time-lag, than the predicted time.

10 Claims, 11 Drawing Sheets

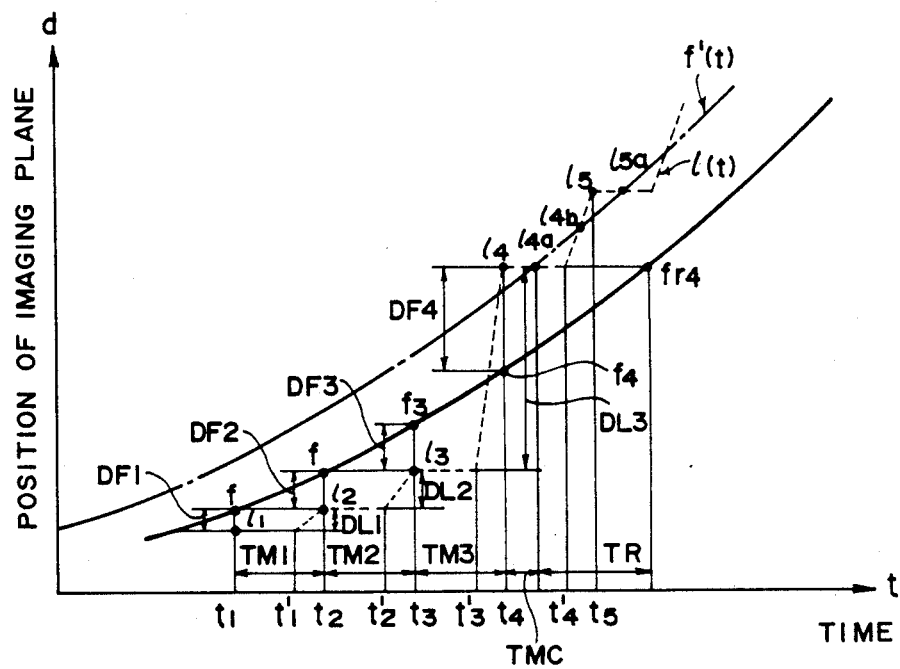
F I G. 13

CAMERA HAVING AN AUTOMATIC FOCUS ADJUSTING APPARATUS

BACKGROUND OF THE INVENTION

1. Field of the Invention

This invention relates to an automatic focus adjusting apparatus for use in a camera or the like.

2. Rekated Background Art

A method of correcting the out-of-focus state attributable to the movement of a moving object when the moving object is always pursued by driving a lens by means of an auto focus apparatus has already been proposed by the same assignee in Japanese Patent Application No. 62-263728.

In the above-mentioned patent application, the movement of the imaging plane of the object is approximated by a quadratic function or a linear function and, on the other hand, the time required for distance measurement calculation, lens driving or release is foreseen under a certain assumption and the imaging plane position of the object at a certain time in the future (for example, the time when the lens driving control is completed, or the time when the shutter curtain is moved after the releasing operation) is foreseen, and in accordance with the result thereof, the lens is driven to said foreseen imaging plane position to thereby eliminate any pursuit delay relative to the object.

However, the movement of the object is continuous, whereas the focus adjusting operation is intermittent and therefore, there is the problem that depending on the timing of the releasing operation an out-of-focus situation occurs during photographing, i.e., during shutter opening. It will hereinafter be explained with reference to the accompanying drawings.

FIG. 2 is a graph for illustrating the above-described lens driving correction method.

In the figure, the horizontal axis represents time t, and the vertical axis represents the imaging plane position d of the object.

A curve f(t) represented by the solid line represents the imaging plane position at time t of the object coming near the camera in the direction of the optic axis when the photo-taking lens is at infinity. A curve l(t) represented by broken line means the imaging plane position of the object in the position of the photo-taking lens at time t, and a section $[t_i, t_i']$ is the focus detecting operation and a section $[t_i', t_{i+1}]$ is the lens driving operation. Accordingly, the difference between f(t) and l(t) at the same time t in the direction of the vertical axis d corresponds to the so-called defocus amount.

DFi represents the defocus amount detected at time ti, DLi represents the amount of lens driving converted into the amount of movement of the imaging plane executed from the result of the focus detection at time ti, and TMi represents the time interval between the focus detecting operations.

In the example of the prior art shown in FIG. 2, as a premise for correction, it is assumed that the imaging plane position of the object changes in accordance with a quadratic function. That is, it is assumed that if the current and past three imaging plane positions $(t_1, f_1)$, $(t_2, f_2)$ and $(t_3, f_3)$ are known at time $t_3$, the imaging plane position $f_4$ at time $t_4$ can be foreseen.

However, what the camera can actually detect are not the imaging plane positions $f_1$, $f_2$ and $f_3$, but the defocus amounts DF1, DF2 and DF3 and the amounts of lens driving DL1 and DL2 converted into the amounts of movement of the imaging plane. Time $t_4$ is a value in the future, and actually is a value which varies with a variation in the accumulation time of an accumulation type sensor, caused by the brightness of the object, but here, for simplicity, it is assumed that $t_4$ is known from the relation that $t_4 - t_3 = t_3 - t_2$.

Under the above-described assumption, the amount of lens driving DL3 when lens driving is effected at time $t_3$, toward $t_4$ from the result of the focus detection at time $t_3$ is found by the use of the following equations:

$$at^2 + bt + c = f(t) \ldots \text{imaging plane position of the object} \quad (1)$$

$$\begin{cases} at_1^2 + bt_1 + c = f_1 & (2) \\ at_2^2 + bt_2 + c = f_2 & (2)' \\ at_3^2 + bt_3 + c = f_3 & (2)'' \end{cases}$$

If the point $l_1$ in FIG. 1 is considered to be the origin, $$f_1 = DF1, f_2 = DF2 + DL1, f_3 = DF3 + DL2 + DL1 \quad (3)$$

$$t_1 = 0, t_2 = TM1, t_3 = TM1 + TM2 \quad (4)$$

If the equations (3) and (4) are substituted into the equations (2), (2)' and (2)'' to find a, b and c, $$a = \frac{DF3 + DL2 - DF2}{(TM1 + TM2) \cdot TM2} + \frac{DF1 - DL1 - DF2}{(TM1 + TM2) \cdot TM1} \quad (5)$$

$$b = \frac{DF2 + DL1 - DF1 - a \cdot TM1^2}{TM1} \quad (6)$$

$$c = DF1 \quad (7)$$

Consequently, the amount of lens driving DL3 converted into the amount of movement of the imaging plane at time $t_4$ is $$\begin{aligned}
DL3 &= f_4 - l_3 \\
&= f_4 - (f_3 - DF3) \\
&= a \cdot (TM1 + TM2 + TM3)^2 + \\
&\quad b(TM1 + TM2 + TM3) + c - \\
&\quad \{a(TM1 + TM2)^2 + b(TM1 + TM2) + c\} + DF3 \\
&= a\{(TM1 + TM2 + TM3)^2 - (TM1 + TM2)^2\} + \\
&\quad b \cdot TM3 + DF3
\end{aligned} \quad (8)$$

Here, assuming that as previously described, TM3 is known from the relation that TM3=TM2, DL3 can be found from the equation (8).

The amount of lens driving at time $t_n$ after time $t_4$ can likewise be found from the past three detected defocus amount $DF_{n-2}$, $DF_{n-1}$, $DF_n$, the past two actual amounts of lens driving $DL_{n-2}$, $DL_{n-1}$ and the past two time intervals $TM_{n-2}$, $TM_{n-1}$.

$$a_n = \frac{DF_n + DL_{n-1} - DF_{n-1}}{(TM_{n-2} + TM_{n-2}) TM_{n-1}} + \quad (8)$$

$$\frac{DF_{n-2} - DL_{n-2} - DF_{n-1}}{(TM_{n-2} + TM_{n-1}) TM_{n-2}}$$

-continued $$bn = \frac{DF_{n-1} + DL_{n-2} - DF_{n-2} - a \cdot TM_{n-2}^2}{TM_{n-2}} \quad (9)$$

$$DL_n = a_n \cdot \{(TM_{n-2} + TM_{n-1} + TM_n)^2 - (TM_{n-2} + TM_{n-1})^2\} + b_n \cdot TM_n + DF_n \quad (10)$$

If in accordance with the equations (8), (9) and (10), the defocus amount $DL_n$ for effecting lens driving is found from the detected defocus amount $DF_n$ and lens driving is effected, proper focusing even to a moving object will always become possible at the end of lens driving.

Now, the aforementioned problem when the releasing operation takes place during such automatic focus adjusting control will be explained with reference to FIGS. 3 and 4.

FIG. 3 shows a case where under a situation in which focus detection is started at time $t_n$ and lens driving of $DL_n$ is effected at $t'_n$ and lens driving is completed at $t_{n+1}$, the releasing operation has taken place at time $t_{x1}$. Here, the time from after the releasing operation has taken place until film exposure is actually effected, i.e., the so-called release time-lag, is TR. Thus, in the figure, film exposure is effected at time $t_{x1}+TR$. In the case of such control that lens driving is stopped simultaneously with the releasing operation, the imaging plane position $l_{x1}$ of the lens at time $t_{x1}$ is intactly the imaging plane position $l_{r1}$ of the lens at time $t_{x1}+TR$, and at this time, the imaging plane of the object lies at $f_{r1}$ and thus, the object image exposed on the film suffers from defocus of $f_{r1}-l_{r1}=d_{x1}$, i.e., out-of-focus.

In the case where that lens driving is continued even if the releasing operation takes place, the imaging plane position of the lens at time $t_{x1}+TR$ is $l'_{r1}$ l and although small in amount, an out-of-focus situation of $f_{r1}-l'_{r1}=d'_{x1}$ still occurs.

FIG. 4 shows a case where the releasing operation has taken place during lens driving. An in the case of FIG. 3, in such control that lens driving is stopped simultaneously with the releasing operation, an out-of-focus situation of $f_{r2}-l_{r2}=d_{x2}$ occurs, and when lens driving is terminated simultaneously with the releasing operation, an out-of-focus situation of $f_{r2}-l'_{r2}=d'_{x2}$ occurs.

A description will now be given of a correction method which takes a uniform release time-lag into account. In this case, the time $t_{n+1}$ can be considered to extend by the release time-lag TR and therefore, the equation (10) is deformed as follows:

$$DL_n = a_n \cdot [(TM_{n-2}+TM_{n-1}+TM_n+TR)^2-(TM_{n-2}+TM_{n-1})^2]+b_n \cdot (TM_n+TR)+DF_n \quad (11)$$

FIG. 5 shows the control of the above equation (11). f'(t) represented by dot-and-dash line is the imaging plane position of the object taking a uniform release time-lag TR into account, and the lens can be controlled so as to be along this curve. Accoridngly, the object in the finder is always out of focus by the release time-lag. Assuming that as in FIG. 3, the releasing operation has taken place at time $t_{x1}$, if lens driving is immediately stopped, the imaging plane position of the lens lies at $l_{r1}$ at time $t_{x1}+TR$, and the actual imaging plane position of the object is $f_{r1}$ and therefore, on out-of-focus situation of $f_{r1}-l_{r1}=d_{x1}$ occurs. Also, if after the releasing operation, the lens is driven by an amount $DL_n$ foreseen at time $t_n$ and the lens driving at that time is terminated, out-of-focus of $f_{r1}-l'_{r1}=d'_{x1}$ occurs. FIG. 6 shows a case where the releasing operation (time $t_{x2}$) has taken place during lens driving (time $t_{n'}-t_{n+1}$), and if lens driving is stopped simultaneously with the releasing operation an out-of-focus situation of $f_{r2}-l_{r2}=d_{x2}$ occurs, and if the lens driving at that time is terminated, an out-of-focus situation of $f_{r2}-l_{r2'}=d_{x2'}$ occurs.

As described above, in the aforedescribed method taking the release time-lag into account, the out-of-focus during state photographing becomes considerably small, but a certain extent of out-of-focus still occurs depending on the release timing.

SUMMARY OF THE INVENTION

The present invention has been made in view of the above-noted points and one aspect of the application is to delay the release interrupting operation until such time that the out-of-focus state during photographing becomes smallest in one focus detecting operation when a releasing operation starting signal interrupts in the middle of an intermittent focus adjusting operation, and to permit release at a point of time whereat the amount of said out-of-focus becomes smallest, thereby ensuring a photograph which is in focus.

Another aspect of the application is to provide, under the above object, a camera in which the releasing operation is started at a point of time whereat the lens driving by said foreseeing focus adjusting operation (the adjusting operation taking the release time-lag into account) is terminated.

A further aspect of the application is to provide, under the above object, a camera in which the releasing operation is started a predetermined time after termination of lens driving.

Other objects of the present invention will become apparent from the following detailed description of some embodiments thereof taken in conjunction with the accompanying drawings.

BRIEF DESCRIPTION OF THE DRAWINGS

FIG. 13 illustrates an example of the lens driving according to another embodiment of the present invention.

DESCRIPTION OF THE PREFERRED EMBODIMENTS

Figure 7:
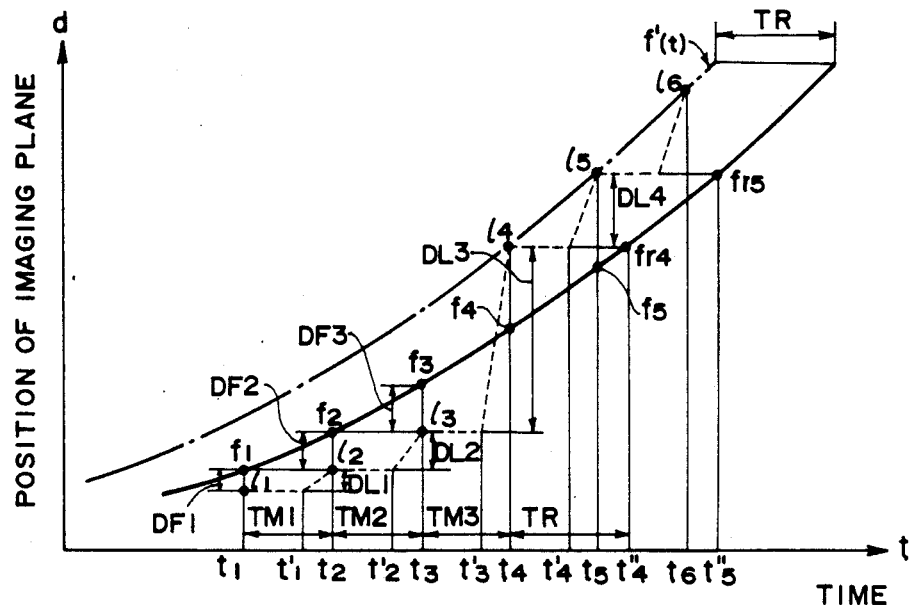
FIG. 7 illustrates an example of the lens driving in an automatic focus adjusting apparatus according to the present invention.

FIG. 7 illustrates a lens driving correction method in an automatic focus adjusting apparatus according to the present invention.

When the position of the imaging plane of the lens is $l_1$, focus detection is effected at time $t_1$ and the defocus amount DF1 is obtained, and lens driving is effected by the amount of lens driving DL1 converted into the amount of movement of the imaging plane corresponding to the defocus amount DF1, whereby the lens arrives at $l_2$.

Second focus detection is effected at time $t_2$ and likewise, the defocus amount DF2 is obtained and, when the lens is driven by the amount of lens driving DL2 the lens arrives at $l_3$.

Third focus detection is effected at time $t_3$ and the amount of lens driving DL3 for driving the lens to the imaging plane position $l_4$ of an object taking a release time-lag TR into account is found from the equation (11), and the lens is driven to said position $l_4$. Thereafter, focus detection is likewise effected at time $t_4$, whereafter the lens is driven to $l_5$, and focus detection is effected at time $t_5$, whereafter the lens is driven to $l_6$.

That is, after the time $t_4$, the imaging plane positions $l_4$, $l_5$ and $l_6$ of the lens at times $t_4$, $t_5$, ... become coincident with the imaging plane positions $f_{r4}$, $f_5$ ... of the object taking the release time-lag into account each time lens driving is completed. Even if a release starting signal comes before the time $t_4$, release is inhibited until the time $t_4$, and release is permitted at the time $t_4$. Thereupon, at time $t_4''$ after TR, the lens lying at $l_4$ and the object coincide with each other at $f_{r4}$, and a photograph which is in focus can be taken.

Even when a release signal comes between $t_4$ to $t_5$, release is likewise delayed until $t_5$ and then is effected and therefore, at time $t_5''$, the lens and the object coincide with each other at $f_{r5}$.

That is, the imaging plane positions $l_4$, $l_5$ and $l_6$ of the lens at the end of each lens driving after the time $t_4$ are coincident with the imaging plane positions $f_{r4}$, $f_5$, ... of the object in the release time-lag TR after the points of time $t_4$, $t_5$, $t_6$, ... at which lens driving is completed and therefore, if the release operation is started at those points of time $t_4$, $t_5$, $t_6$, ..., a photograph in which the imaging plane positions of the object and the lens are coincident with each other can always be taken.

Figure 8:
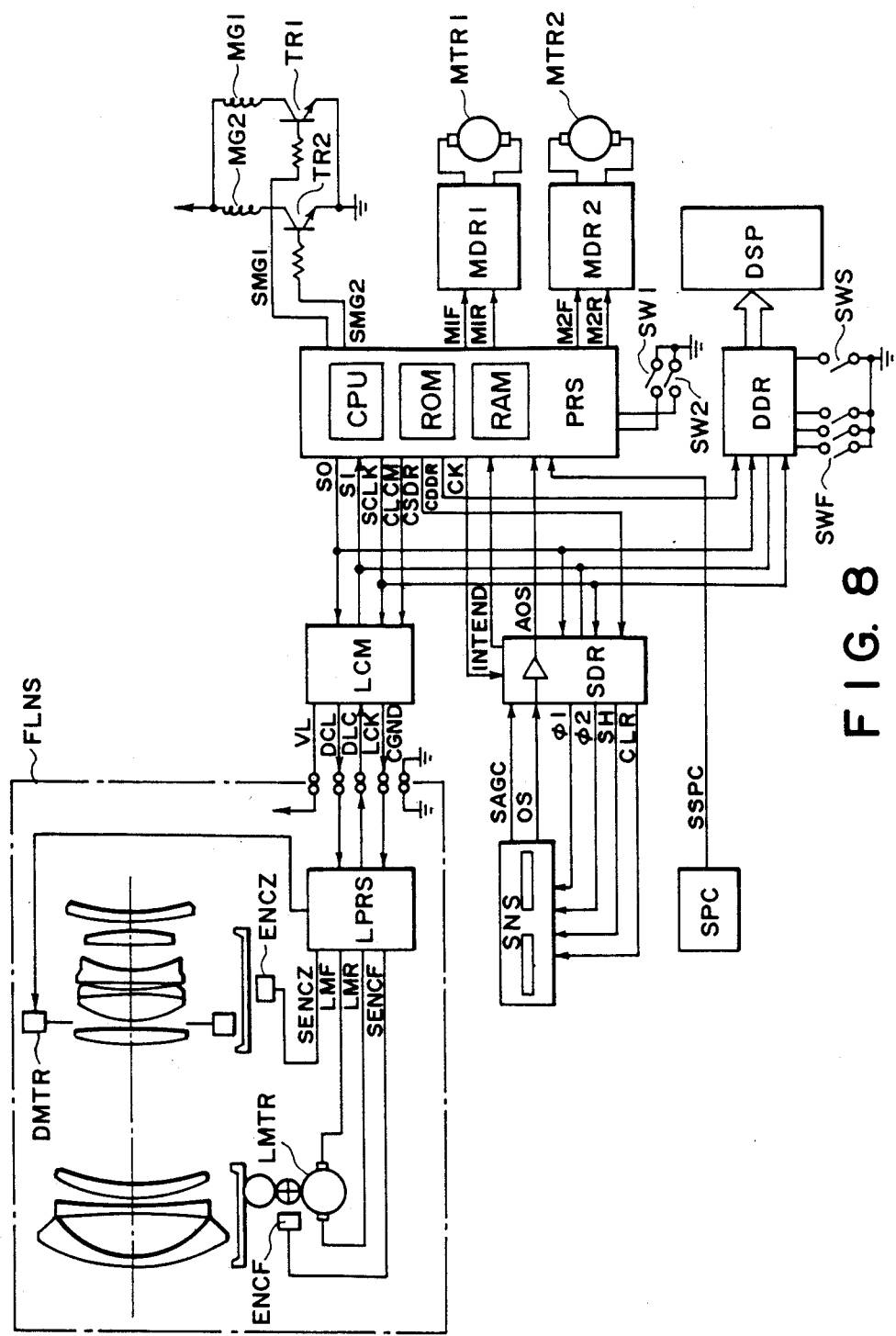
FIG. 8 is a circuit diagram showing an embodiment of a camera having the automatic focus adjusting apparatus of the present invention.

FIG. 8 is a circuit diagram showing an embodiment of a camera provided with the auto focus apparatus according to the present invention.

In FIG. 8, PRS designates a one-chip microcomputer having, for example, a CPU (central processing unit), a ROM, a RAM and A/D converting function therein. The computer PRS performs a series of operations of the camera such as the automatic exposure control function, the automatic focus detecting function and the winding-up of film in accordance with the sequence program of the camera stored in the ROM. For this purpose, the computer PRS communicates with the surrounding circuits in the camera body and the lens and controls the operations of the respective circuits and lens by the use of synchronizing type communication signals SO, SI and SCLK and communication selection signals CLCM, CSDR and CDDR.

SO is a data signal output from the computer PRS, SI is a data signal input to the computer PRS, and SCLK is a synchronizing clock for the signals SO and SI.

LCM denotes a lens communication buffer circuit which supplies electric power to a power source terminal for the lens when the camera is operating and which provides a communication between the camera and the lens when the selection signal CLCM from the computer PRS is at a high potential level (hereinafter abbreviated as 'H').

That is, when the computer PRS renders CLCM into 'H' and supplies predetermined data from SO in synchronism with SCLK, LCM outputs the buffer signals LCK and DCL of SCLM and SO, respectively, to the lens through the contact terminals between the camera and the lens. Simultaneously therewith, LCM outputs the buffer signal of the signal DLC from the lens to SI, and the computer PRS inputs the data of the lens from SI in synchronism with SCLK.

SDR designates a driving circuit for a focus detecting line sensor device SNS comprised of a CCD or the like. The driving circuit SDR is selected when the signal CSDR is at 'H', and is controlled from the computer PRS by the use of SO, SI and SCLK.

Signal CK is a clock signal for producing CCD driving clocks $\phi 1$ and $\phi 2$, and signal INTEND is a signal which informs the computer PRS that the accumulating operation has been completed.

The output signal OS of the sensor device SNS is a time-serial image signal synchronized with the clocks $\phi 1$ and $\phi 2$, and is amplified by an amplifying circuit in the driving circuit SDR, whereafter it is output as AOS to the computer PRS. The computer PRS inputs AOS from an analog input terminal, and A/D-converts it by the A/D converting function therein in synchronism with CK, and thereafter stores it at a predetermined address of the RAM.

SAGC which also is an output signal of the sensor device SNS is the output of a sensor for AGC (auto gain control) in the sensor device SNS, and is input to the driving circuit SDR for use for the control of the accumulation in the sensor device SNS.

SPC denotes a photometric sensor for exposure control which receives the light from the object through the photo-taking lens, and the output SSPC thereof is input to the analog input terminal of the computer PRS and is A/D-converted, whereafter it is used for automatic exposure control (AE) in accordance with a predetermined program.

DDR designates a circuit for switch detection and display which is selected when the signal CDDR is at 'H', and is controlled from the computer PRS by the use of SO, SI and SCLK. That is, it changes over the display on the display member DSP of the camera on the basis of data supplied from the computer PRS, and informs the computer PRS of the ON-OFF states of the various operating members of the camera by communication. One SWF of switches SWS is a mode changeover switch for selecting focus priority or release priority which will be described later.

Switches SW1 and SW2 are switches operatively associated with a release button, not shown, and the switch SW1 is adapted to be closed by the first-stage depression of the release button, and the switch SW2 is adapted to be closed by the depression of the release button to the second stage. The computer PRS, as will be described later, performs photometry and auto focus adjusting operation when the switch SW1 is ON, and performs exposure control and winding-up of film with the switch SW2 ON as a trigger. The switch SW2 is connected to the "interruption input terminal" of the microcomputer PRS, and even when the program is being executed during the ON state of the switch SW1, interruption is applied by the ON state of the switch SW2 and a shift can be immediately be made to a predetermined interruption program.

MTR1 designates a film feeding motor, and MTR2 denotes a motor for driving the mirror up and down and for the shutter spring charge. These motors have their forward and reverse rotations controlled by their respective driving circuits MDR1 and MDR2. Signals M1F, M1R and M2R input from the computer PRS to the driving circuits MDR1 and MDR2 are motor controlling signals.

MG1 and MG2 designate magnets for starting the movement of the forward and rearward shutter curtains, and these magnets are electrically energized by signals SMG1 and SMG2 and amplifying transistors TR1 and TR2, and shutter control is effected by the computer PRS.

The circuit DDR for switch detection and display, the motor driving circuits MDR1 and MDR2 and shutter control have no direct relation with the present invention and therefore need not be described in detail.

Signal DCL input to the control circuit LPRS in the lens in synchronism with LCK is command data from the camera to the lens FLNS, and the operation of the lens in response to the command is predetermined.

The control circuit LPRS analyzes the command in accordance with a predetermined procedure, and performs the focus adjusting operation and the aperture controlling operation and effects the outputting of the various operational situations of the lens (such as how much the focus adjusting optical system has been moved and by how many steps the aperture has been stopped down) and parameters (such as the open F-number, the focal length and the coefficient of the defocus amount vs. the amount of axial movement) from an output DLC.

An example of a zoom lens is shown in the present embodiment, and when a command for focus adjustment is sent from the camera, a focus adjusting motor LMTR is driven by signals LMF and LMR in accordance with the amount and direction of driving sent at the same time, whereby the optical system is moved in the direction of the optic axis to effect focus adjustment. The amount of movement of the optical system is monitored by the pulse signal SENCF of an encoder circuit ENCF and is counted by a counter in the control circuit LPRS, and at a point of time whereat predetermined movement has been completed, the control circuit LPRS itself renders signals LMF and LMR into 'L' and brakes the motor LMTR.

Therefore, once the command for focus adjustment has been sent from the camera, the controller PRS in the camera need not with be concerned in lens driving until the lens driving is completed. Also, the content of said counter can be delivered to the camera as required.

When a command for aperture control is sent from the camera, a conventional stepping motor DMTR is driven for aperture driving in accordance with the number of aperture steps sent at the same time.

ENCZ denotes an encoder circuit annexed to the zoom optical system, and the control circuit LPRS inputs a signal SENCZ from the encoder circuit ENCZ and detects that zoom position. Lens parameters in various zoom positions are stored in the control circuit LPRS, and when there is a requirement from the computer PRS of the camera, a parameter corresponding to the current zoom position is delivered to the camera.

Figure 9:
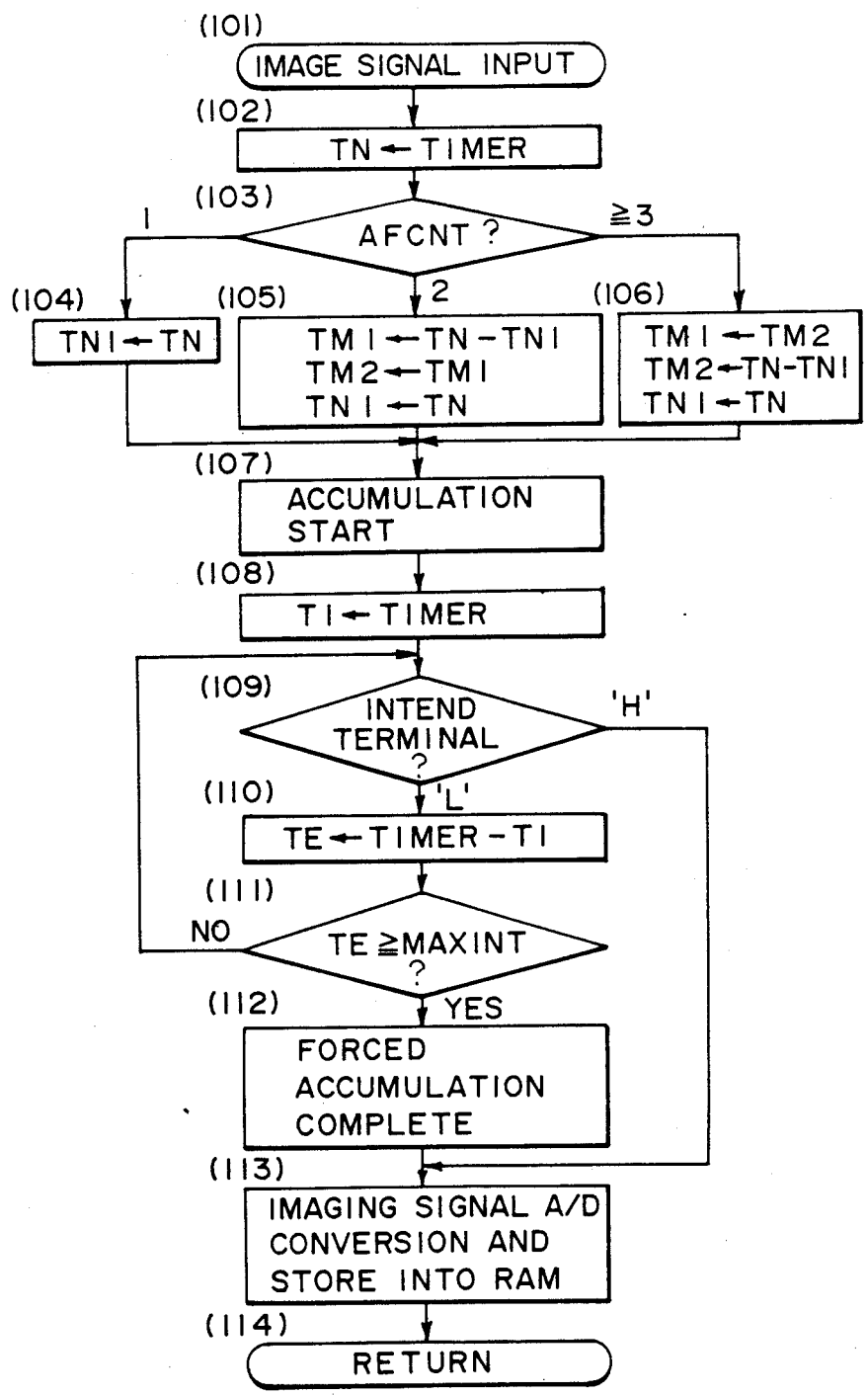
FIGS. 9, 10, 11 and 12 illustrate sub-routine flows used in the control flow shown in FIG. 1.

The operation of the camera of the above-described construction will now be described with reference to the flow charts of FIGS. 1, 9 and so on.

When a power source switch, not shown, is closed, the supply of electric power to the microcomputer PRS is started and the computer PRS starts to execute the sequence program stored in the ROM.

Figure 1:
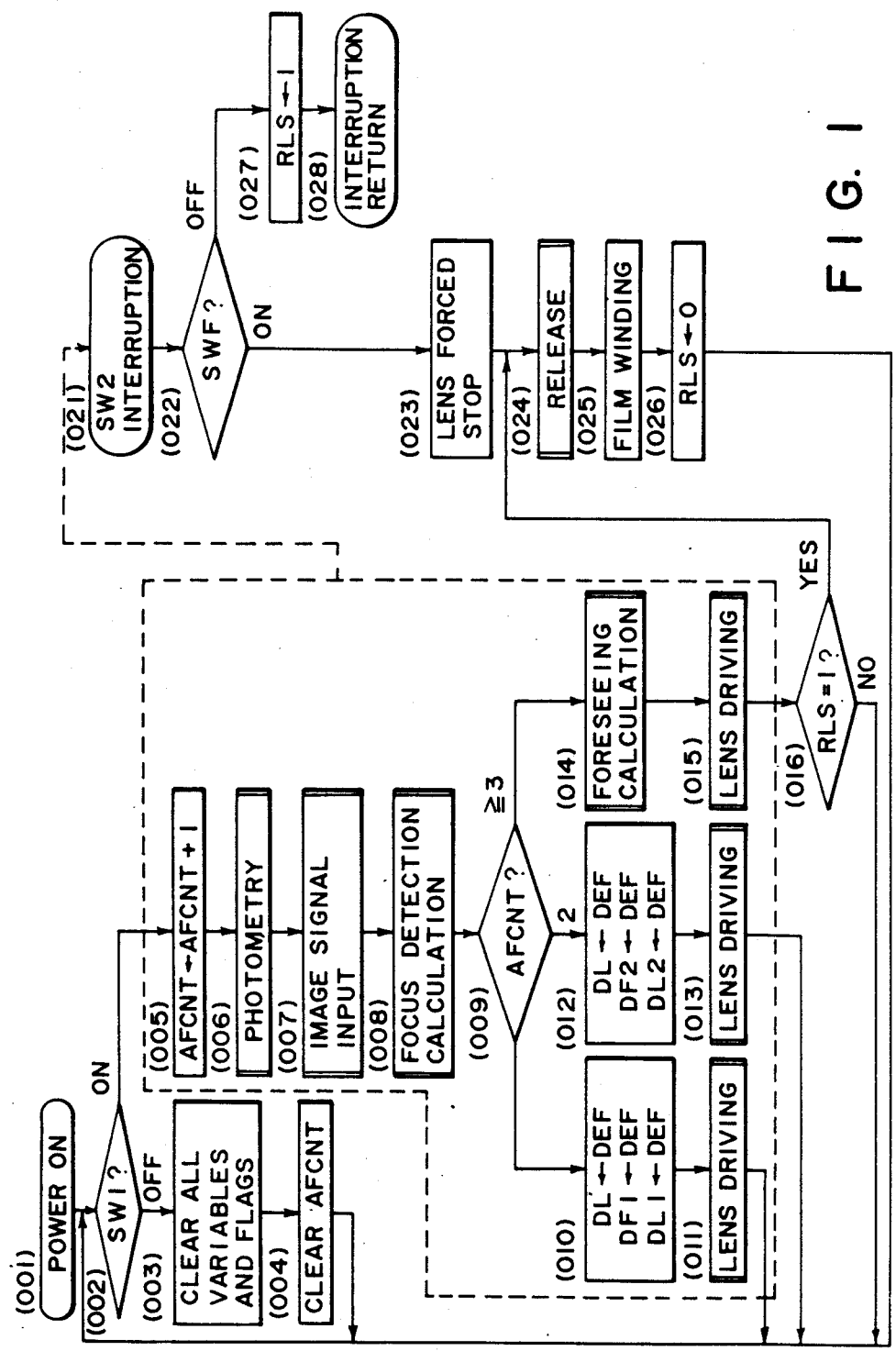
FIG. 1 shows the control flow of a camera having the automatic focus adjusting apparatus of the present invention.
Figure 2:
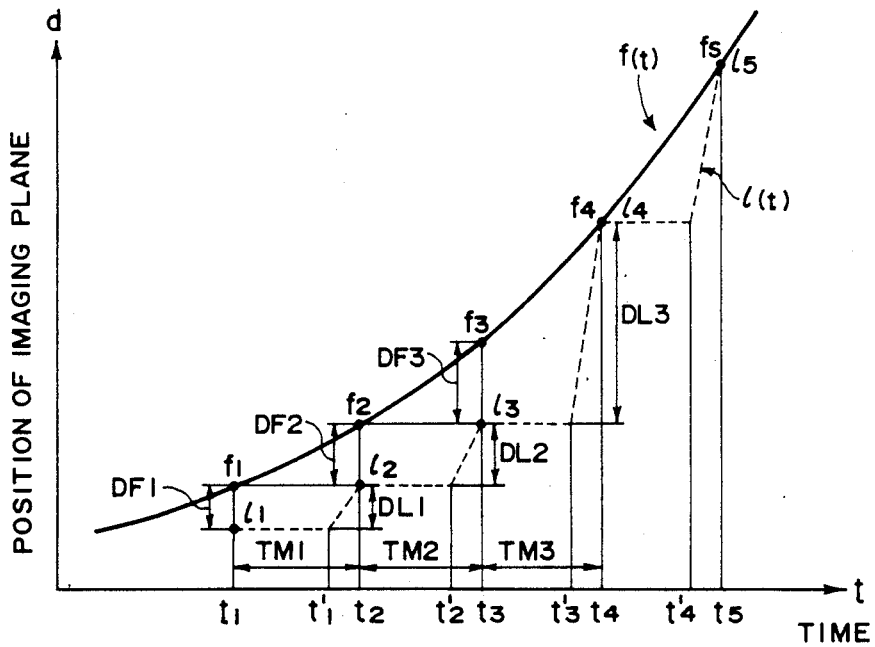
FIGS. 2, 3, 4, 5 and 6 illustrate some examples of the lens driving in an automatic focus adjusting apparatus according to the previously filed Japanese patent application 62-263728.
Figure 3:
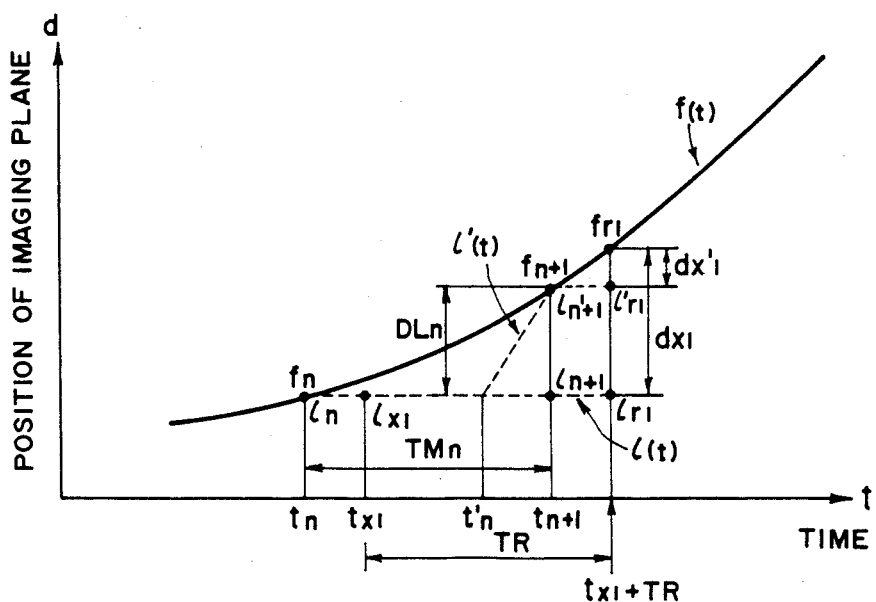
Figure 4:
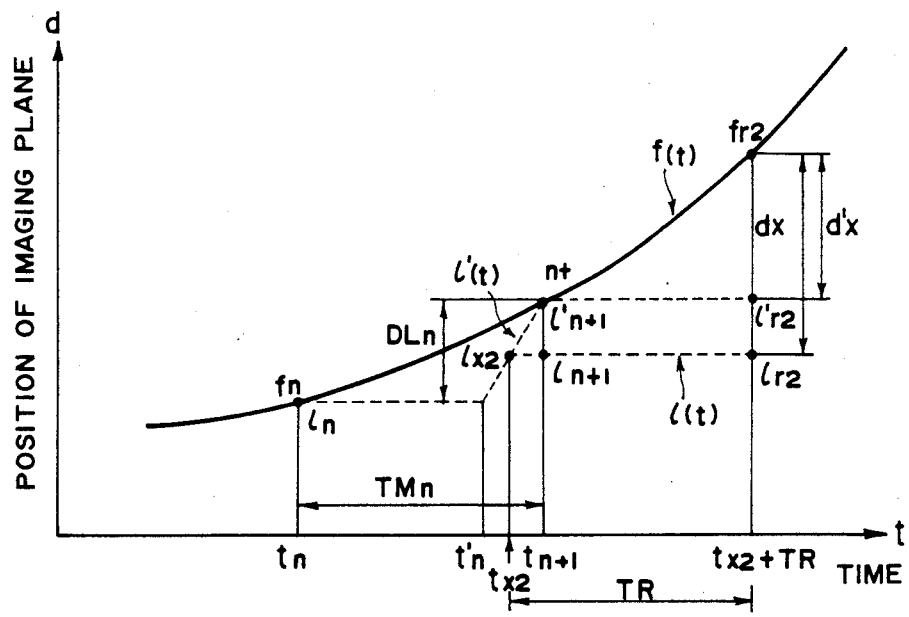
Figure 5:
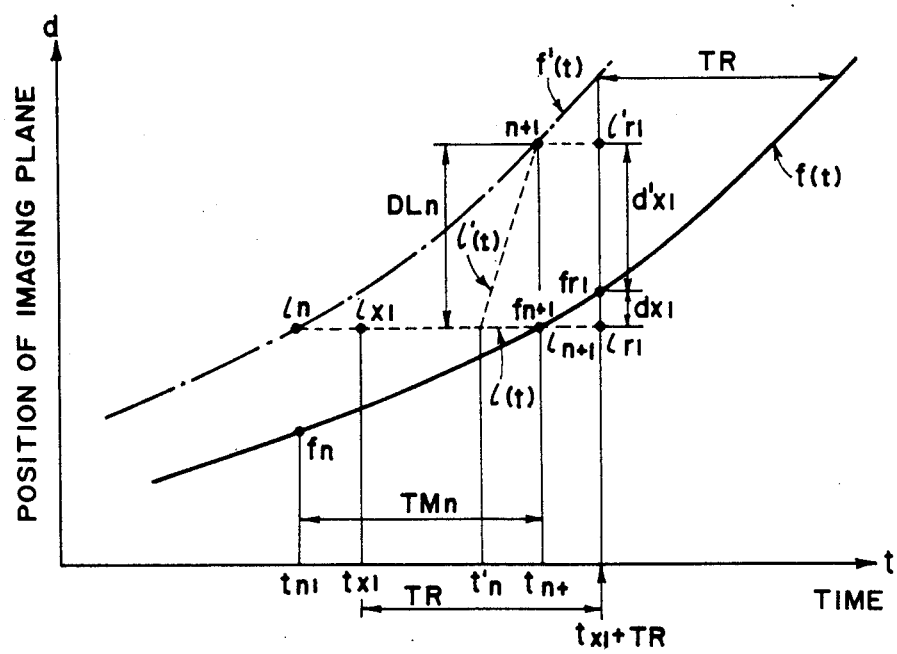
Figure 6:
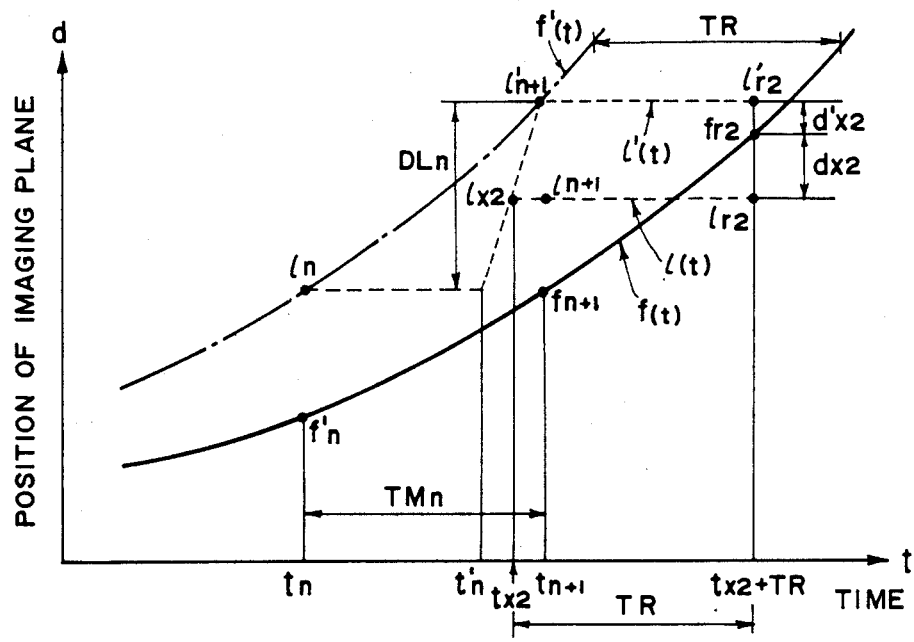

FIG. 1 is a flow chart showing the general flow of said program. When the execution of the program is started by the above-described operation, the state of the switch SW1 adapted to be closed by the first-stage depression of the release button is detected at step (002) via step (001), and when the switch SW1 is OFF, shift a is made to step (003), where all control flags and variables set in the RAM in the computer PRS are cleared and initialized, and at step (004), a counter AFCNT for counting the frequency of the focus adjusting cycle (focus detection and lens driving) is cleared. Said steps (002)–(004) are repetitively executed until the switch SW1 becomes ON or the power source switch becomes OFF.

By the switch SW1 becoming ON, a shift is made from step (002) to step (005).

At step (005), a new focus adjusting cycle is started and therefore, the value of the counter AFCNT is increased by one and the frequency of said cycle is counted.

At step (006), the "photometry" sub-routine for exposure control is executed. The computer PRS inputs the output SSPC of the photometering sensor SPC shown in FIG. 8 to the analog input terminal thereof, A/D-converts it, calculates an optimum shutter control value and an optimum aperture control value from the digital photometric value thereof, and stores them into predetermined addresses of the RAM. During the releasing operation, control of the shutter and aperture is effected on the basis of these values.

Subsequently, at step (007), the "image signal input" sub-routine is executed. The flow of this subroutine is shown in FIG. 9, and the computer PRS effects the inputting of an image signal from the focus detecting sensor device SNS. The details will be described later.

The defocus amount DEF of the photo-taking lens is calculated on the basis of the image signal input at the next step (008). The specific calculation method is disclosed by the applicant in Japanese Patent Application No. 61-160824 and therefore need not be described in detail.

At step (009), the content of the counter AFCNT is detected, and when AFCNT = 1 and 2, the foreseeing calculation cannot yet be effected, and therefore the defocus amount DEF found at step (008) is intactly used as the amount of lens driving DL and at the same time, this defocus amount DEF is stored as the data for the foreseeing calculation. That is, when AFCNT = 1, at step (010), DEF is stored into memories DL, DF1 and DL1, and when AFCNT = 2, at step (012), DEF is stored into memories DL, DF2 and DL2. Thereafter, the two flows effect lens driving in accordance with the content of the memory DL at step (011) or (013) and return to step (002).

When AFCNT ≧ 3 at step (009), the foreseeing calculation is possible and therefore, foreseeing calculation is effected in the "foreseeing calculation" sub-routine of step (014), and then step (015) is executed.

At the next step (016), the state of flag RLS is discriminated, and RLS is a flag which represents whether release interruption has been made, and the details thereof will be described later. Here, release interruption is made, that is, it is judged that RLS = 0, and a return is made to step (002).

A description will now be given of a case where the release interruption by the closing of the switch SW2 has been made when the operations in the focus adjusting cycle shown in the steps (005)–(015) encircled by the broken line are being executed. The to the interruption input terminal of the computer PRS, and the design is made such that when the switch SW2 is closed, a shift is immediately made to step (021) by the interrupting function even if any step is being executed.

When the switch SW2 interruption of step (021) is made when the steps encircled by the broken line are being executed, the state of the switch SWF is discriminated at step (022). The switch SWF is a switch for selecting whether the releasing operation should be immediately performed (hereinafter referred to as the release priority) when there is release interruption, or whether the releasing operation should be permitted after the focus adjusting operation being executed is completed (hereinafter referred to as the focus priority), and is a switch selected by the photographer. When the switch SWF is ON, the release priority is prescribed, and when the switch SWF is OFF, the focus priority is prescribed.

Here, assuming that the switch SWF is ON, the lens is forcibly stopped at step (023) and immediately at step (024), a shift is made to the releasing operation. That is, the release priority takes place. The subroutine of step (024) will be described later.

Subsequently, at step (025), film winding is effected, whereby one frame of the film is wound up by properly controlling the motor controlling signals M1F and M1R shown in FIG. 8, but the detailed description of the operation therefor is omitted.

At the next step (026), the RLS resetting after the completion of the release is effected, whereafter a return is made to step (002).

If the switches SW1 and SW2 remain closed even after a return has been made to step (002), release interruption takes place again at the next step (005) and therefore, thereafter continuous photography takes place without the focus adjusting cycle (005)–(015) being executed.

A description will now be given the operation during the release interruption when the switch SWF is OFF.

First, when the release interruption is made while the focus adjusting cycle is the first time, i.e., in the flow of steps (005)–(011) or while the focus adjusting cycle is the second time, i.e., in the flow of steps (005)–(013), the switch SWF is detected as being OFF at step (022), whereafter at step (027), the flag RLS becomes 1 and latches the state in which the release interruption has been made, and at step (028), an interruption return is made to the original step at the point of time whereat the release interruption has been made. In the first and second focus adjusting cycles, no branching-off takes place to the release sub-routine after the completion of lens driving, and the third focus adjusting cycle (the flow (005)–(015)) is effected (step 016), whereafter the flag RLS is judged as RLS =1, and an advance is made to the release of step (024). Also when the release interruption is made in and after the third focus adjusting cycle, i.e., in the flow of steps (005)–(015), an advance is made from step (022) to step (027), where RLS =1 is latched, whereafter a return is made and after the completion of that focus adjusting cycle, branching-off takes place from step (016) to step (024), where release is effected. Step (025) is then executed, and at step (026), the flag RLS is reset and a return is made to step (002). If at this time, the switch SW1 becomes ON and the switch SW2 remains closed when the next focus adjusting cycle is entered, the switch SW2 interruption and a return similar to what has been described above are effected, and release takes place after that focus adjusting cycle is completed. That is, if the switch SW2 remains closed, continuous photography such that release is effected after the operation of one focus adjusting cycle has been completed without fail takes place.

After the release, the flag RLS is reset and therefore, if only the switch SW1 remains closed and the switch SW2 is off when the return is made to step (002), the focus adjusting cycle (005)–(015) is executed, whereafter at step (016), the flag RLS is judged as RLS =0 and a return is made to step (002). That is, only the focus adjusting cycle is repeated again.

As described above, in the present invention, if the switch SWF is kept OFF, the shift to the releasing operaiton (024) takes place after step (015), and in the "foreseeing calculation" sub-routine which will be described later, the amount of lens driving to the imaging plane position taking the release time-lag into account is found, and thus the releasing operation is effected at the point of time whereat the lens has been driven by this amount of lens driving, and the releasing operation is started at the points of time $t_4, t_5, t_6, \ldots$ shown in FIG. 7, and photographing in which the imaging plane position of the object at the start of exposure is coincident with the imaging plane position of the lens can be accomplished.

A description will now be given of the image signal input sub-routine shown in FIG. 9.

The "image signal input" sub-routine is an operation executed at the beginning of a new focus detecting operation, and when this sub-routine is called, the timer value TIMER of the self-running timer of the microcomputer PRS itself is stored in a memory area TN of the RAM at step (102) via step (101), whereby the starting time of the focus detecting operation is memorized.

At the next step (103), the state of the counter AFCNT is detected, and if AFCNT =1, it means the first focus adjusting operation and therefore, there is no focus adjusting cycle time interval and accordingly, TN is only stored in TN1 and an advance is made to step (107).

When AFCNT =2, the time interval TM1 between the last and the current focus adjusting cycle is defined by TM1→TN−TN1 (TN is the starting time of the current focus detection, and TN1 is the starting time of the last focus detection defined at step (104), and consequently, TN−TN1 is the focus adjusting cycle time interval). Also, TM2←TM1 is set up, and the reason therefor will be described later. TN is stored into TN1 and renewal of TN1 is effected.

When AFCNT ≧3, there are two focus adjusting cycle time interval data TM1 and TM2 to be renewed and therefore, renewal is effected by the formula of step (106) and renewal of TN1 is effected in the same manner as at step (105). The TM1 defined at step (105) is used as the TM1 when AFCNT =3; but renewal is effected as TM1←TM2 and therefore, TM2 must be defined for that purpose. This is the reason why at step (105), TM2 has been defined. That is, when AFCNT=3, the TM1 defined when AFCNT =2 remains as TM1, and when AFCNT ≧4, renewal of TM1←TM2 is effected.

That is, at these steps (104)–(106), the before-last focus adjusting cycle time interval data is always renewed and input to TM1 and the last focus adjusting cycle time interval data is always renewed and input to TM2 each time the focus adjusting cycle is executed.

Now, at the next step (107), the sensor device SNS is caused to start the accumulation of optical images. Specifically, the microcomputer PRS delivers an "accumulation starting command" to the sensor driving circuit SDR by communication, and in response thereto, the driving circuit SDR renders the clear signal CLR of the photoelectric converting element portion of the sensor device SNS into 'L' and causes the sensor device to start the accumulation of charges.

At step (108), the timer value of the self-running timer is stored in a variable TI and the current time is memorized.

At the next step (109), the state of the input INTEND terminal of the computer PRS is detected, and whether the accumulation has been completed is examined. The sensor driving circuit SDR renders the signal INTEND into 'L' simultaneously with the start of the accumulation, and monitors the AGC signal SAGC from the sensor device SNS, and renders the signal INTEND into 'H' and at the same time renders the charge transfer signal SH into 'H' for a predetermined time when the signal SAGC reaches a predetermined level, thereby causing the charges of the photoelectric converting element portion to be transferred to the CCD portion.

If at step (109), the INTEND terminal is at 'H', it means that the accumulation has been completed, and a shift is made to step (113), and if the INTEND terminal is at 'L', it means that the accumulation is not yet completed, and a shift is made to step (110).

At step (110), the time TI memorized at step (108) is subtracted from the timer value TIMER of the self-running timer and the result is stored in TE. Thus, the time from after the accumulation has been started until now, i.e., the so-called accumulation time, is stored in TE.

At the next step (111), TE is compared with a constant MAXINT, and if TE is less than MAXINT, a return is made to step (109), where the completion of the accumulation is again waited for. If TE becomes greater than MAXINT, a shift is made to step (112), where the accumulation is forcibly completed.

The forced completion of the accumulation is executed by an "accumulation completion command" being delivered from the computer PRS to the driving circuit SDR. When the "accumulation completion command" is delivered from the computer PRS to the driving circuit SDR, the latter renders the charge transfer signal SH into 'H' for a predetermined time and causes the charges of the photoelectric converting portion to be transferred to the CCD portion. Thus, the accumulation by the sensor is completed by the flow up to step (112).

At step (113), the signal AOS obtained by amplifying the image signal OS of the sensor device SNS by the sensor driving circuit SDR is A/D-converted and the resultant digital signal is stored into the RAM. More particularly, the sensor driving circuit SDR produces CCD driving clocks $\phi 1$ and $\phi 2$ in synchronism with the clock CK from the computer PRS and imparts them to the control circuit in the sensor device SNS, which has its CCD portion driven by the clocks $\phi 1$ and $\phi 2$ and the charges in the CCD are time-serially output as an image signal from the output OS. This signal is amplified by an amplifier in the sensor driving circuit SDR, whereafter it is input as AOS to the analog input terminal of the computer PRS. The computer PRS effects A/D conversion in synchronism with the clock CK being output by itself, and the digital image signals after the A/D conversion are successively stored at predetermined addresses of the RAM.

When the inputting of the image signal is completed in this manner, the "image signal input" subroutine is returned to the main program at step (114).

Figure 10:
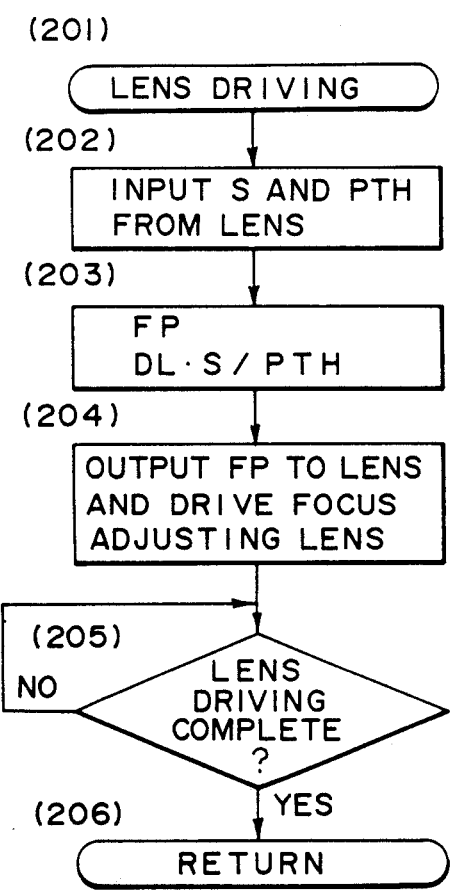

FIG. 10 shows the flow chart of the "lens driving" sub-routine.

When this sub-routine is executed, communication is effected with the lens at step (202) and two data "S" and "PTH" are input. "S" is the "coefficient of the defocus amount vs. the amount of axial movement of the focus adjusting lens" inherent to the photo-taking lens, and for example, in the case of a totally axially moved type single lens, S = 1 because the entire photo-taking lens is a focus adjusting lens, and in the case of a zoom lens, S is varied by each zoom position. "PTH" is the amount of axial movement of the focus adjusting lens per pulse of the output of the encoder ENCF operatively associated with the movement of the focus adjusting lens LNS in the direction of the optic axis.

Thus, the value obtained by converting the amount of axial movement of the focus adjusting lens into the output pulse number of the encoder by the defocus amount DL to the focus-adjusted and said S and PTH, i.e., the so-called amount of lens driving FP, is given by the following equation:

FP=DL×S/PTH

Step (203) executes the above equation as it is.

At step (204), FP found at step (203) is delivered to the lens and the driving of the focus adjusting lens (in the case of a totally axially moved type single lens, the entire photo-taking lens) is commanded.

At the next step (205), communication is effected with the lens and whether the driving by the amount of lens driving FP commanded at step (204) has been completed is detected, and when the driving is completed a shift is made to step (206).

Detection of the completion of the driving by said amount of lens driving FP is executed by said amount of lens driving FP being input to the counter in the control circuit LPRS by said communication, and detecting the coincidence between this counter value and the count value of the pulse SENCF output from the encoder ENCF with the lens driving by said control circuit LPRS.

Figure 11:
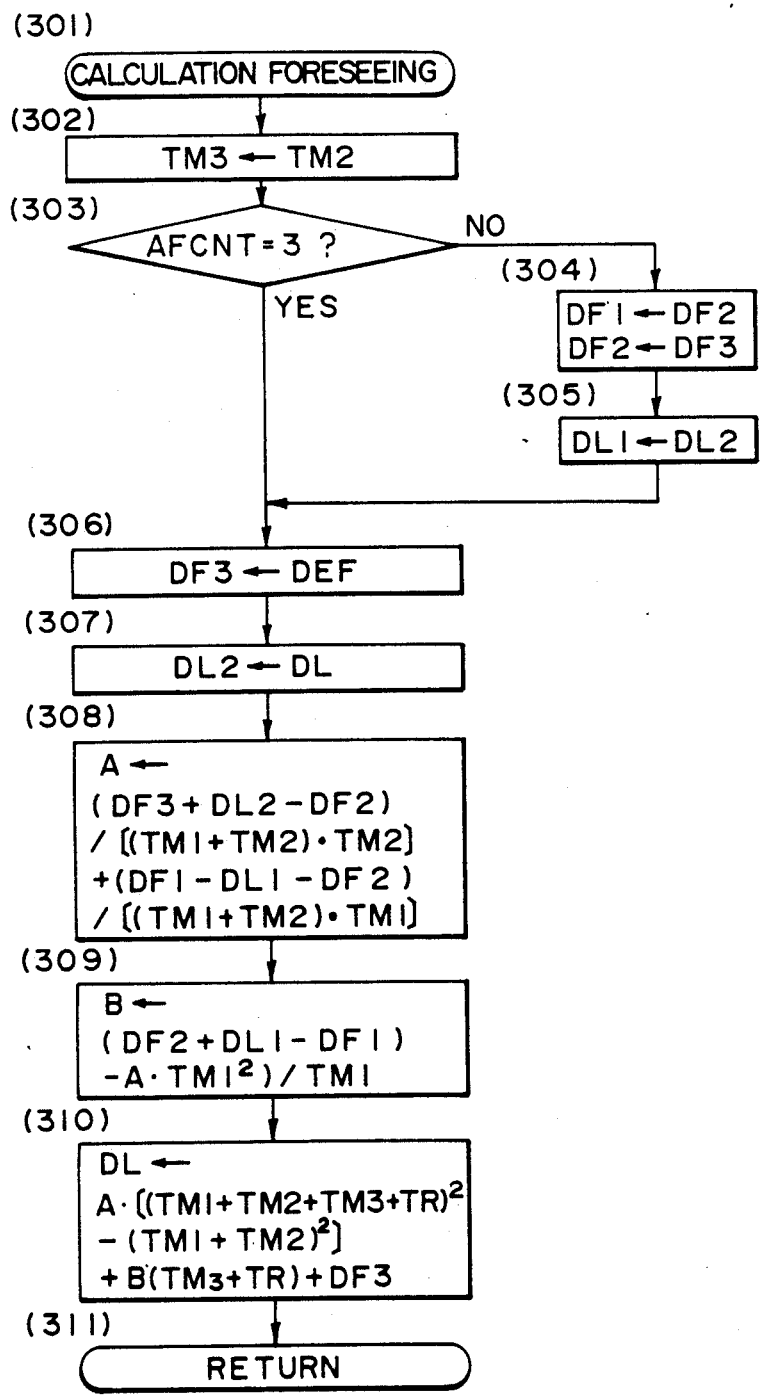

FIG. 11 shows the flow chart of foreseeing calculation. This is a flow in which when there are three or more data in the focus adjusting cycle, the imaging plane position of the object is approximated by a quadratic function on the basis of the data obtained by the execution of the latest three focus adjusting cycles and the imaging plane position in the future is foreseen.

First, at step (302), the data of a memory area TM2 is input to a memory area TM3 on the assumption that the time interval TM3 from the current to the next focus adjusting cycle is equal to the time interval TM2 from the last to the current focus adjusting cycle.

At step (303), the state of the counter AFCNT is detected, and when AFCNT =3, that is, when this sub-routine is called for the first time, an advance is made to step (306). At step (306), the current detected defocus amount DEF found in the current focus detection calculation sub-routine is stored in a memory DF3, and an advance is made to step (307), where the data of the memory DL is input to a memory DL2. The data of the memory DL is the data input at step (012), and is DEF in the last focus adjusting cycle, i.e., the amount of lens driving converted into the last amount of movement of the imaging plane, whereby the information of the last amount of lens driving is stored in the memory DL2.

At step (308), calculation of the equation (5) is carried out to find a of the equation (5). The then data of the memories DF2, DF1 and DL1 are the data of the last and before-last defocus amounts found at steps (010) and (012) and the before-last amount of lens driving, and on the basis of these data, the last amount of lens driving and the current defocus amount obtained at steps (306) and (307), and the data of the time interval between the before-last and the last focus adjusting cycle found at step (106) and input to the memories TM1 and TM2, calculation of the equation (5) is carried out to find a, which is set as A.

At step (309), b is found in accordance with the equation (6), and this is set as B. The data at this step also are the data input to the memories DF2, DF1 and DL1 and the memory area TM1. At step (310), calculation of the equation (11) is carried out to find the current amount of lens driving DL.

The amount of lens driving DL in this case is the one found from the equation (11) and is therefore an amount for bringing the imaging plane position of the object taking the release time-lag into account into coincidence with the imaging plane position of the lens, whereby the foreseeing calculation for effecting the above-mentioned alignment of the imaging plane positions is completed and at step (311), a return is made to the main program.

Also, when at the step (303) in this foreseeing calculation sub-routine, AFCNT $\neq 3$, that is, AFCNT $\geq 4$, steps (304) and (305) are executed.

At step (304), the data of the memory DF2 is input to DF1. The last defocus amount is input to the memory DF2 before the current sub-routine is executed, but at the point of time whereat the current sub-routine is executed, the content of DF2 is the before-last defocus amount and therefore, this is input to the memory DF1.

The content of the memory DF3 also is already the last defocus amount at the point of time whereat the current sub-routine is executed and therefore, this is input to the memory DF2. The focus adjusting cycle is executed by the processing of steps (304) and (305), and each time a new defocus amount is found, the contents of the memories DF1 and DF2 are successively renewed and thus, the before-last defocus amount and the last defocus amount are always stored in the memories DF1 and DF2, respectively.

Also, at step (305), the data of the memory DL2 is input to the memory DL1. This processing also is the processing for the same purpose as the step (304), whereby the before-last amount of lens driving is always stored in the memory DL1.

Thereafter, steps (306) and (307) are executed, and the current defocus amount is input to the memory DF3 and the amount of lens driving DL found at the step (310) of the last foreseeing claculation subroutine, i.e., the last amount of lens driving, is input to the memory DL2, and the steps (308)–(310) are executed on the basis of these data, and even when the focus adjusting cycle is effected four or more times, such amount of lens driving DL that the imaging plane position of the lens at the end of each cycle is the position taking the release time-lag into account is found.

Figure 12:
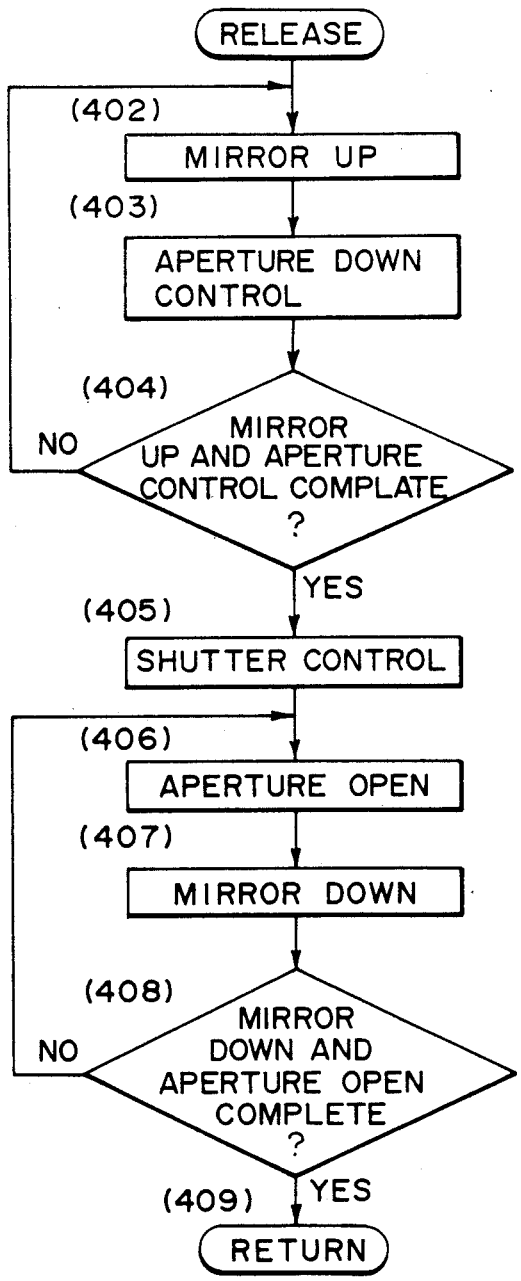

FIG. 12 shows the flow of the release sub-routine.

First, at step (402), the mirror-up movement of the quick return mirror of the camera is effected. This is executed by controlling the motor MTR2 by the use of the motor controlling signals M2F and M2R shown in FIG. 8 through the driving circuit MDR2.

At the next step (403), the aperture control value already stored by the photometry sub-routine of the previously mentioned step (006) is delivered to the lens, whereby the lens is caused to effect aperture control.

Whether the mirror-up movement and the aperture control steps (402) and (403) have been completed is detected at step (404), but usually several tens of milliseconds are required for these two controls, and this is the main factor of the so-called release time-lag.

At step (404), whether the mirror-up movement and the aperture control of the previous steps (402) and (403) have already been completed is detected. The mirror-up movement can be confirmed by means of a detecting switch, not shown, annexed to the mirror and the aperture control is confirmed by communication as to whether the lens has been driven to a predetermined aperture value. If one of the mirror-up movement and the aperture control is not yet completed, standly takes place at this step and the detection of the state is continued. When the two controls are confirmed, a shift is made to step (405). At this point of time, the preparations for exposure have been made.

At step (405), control of the shutter is effected at the shutter control value already stored by the photometry sub-routine of the aforementioned step (006) and the film is exposed.

When the control of the shutter is completed, at the next step (406), a command is sent to the lens so as to render the aperture into an open state, and subsequently, at step (407), mirror down movement is effected. The mirror-down movement, like the mirror-up movement, is executed by controlling the motor MTR2 by the use of the motor controlling signals M2F and M2R.

At the next step (408), as at step (404), completion of the mirror-down movement and the aperture open control is waited for. When the mirror-down movement and the aperture open control are both completed a, shift is made to step (409), where a return is made to the main program.

Summing up the above-described flow, in FIG. 1, in the first and second focus adjusting cycles after the closing of the switch SW1, lens driving is effected in accordance with the value of the defocus amount DEF detected by the flow of steps (005)–(011) or (005)–(013), and in the third and subsequent focus adjusting cycles, the foreseeing driving using the quadratic functional equation 11 is effected by the flow of steps (005)–(015) in accordance with the result of the past two focus adjustments and the result of the current focus adjustment.

A release interruption is made by the closing of the switch SW2 during said focus adjusting cycle, when the switch SWF is ON, that is, the release priority mode is selected a shift is immediately made to the releasing operation.

On the other hand, when the switch SWF is OFF, that is, in the release interruption in the focus priority mode, if the focus adjusting cycle is less than three times, release is delayed until after the completion of three focus adjusting cycles, and if the focus adjusting cycle is three or more times, release is effected after the completion of that focus adjusting cycle. Also, where continuous photography is to be effected thereafter, continuous photography such that release is effected after the focus adjusting cycle has been completed once without fail for each frame is effected.

With such a construction, the releasing operation is performed after the lens is moved to the imaging plane position taking the release time-lag into account on the basis of foreseeing calculation, and at the point of time thereafter whereas exposure is started after the release time-lag, the imaging plane position of the object and the imaging plane position of the lens coincide with each other and thus, a photograph which is properly in focus can be taken.

In the above-described first embodiment, during the focus priority mode, photographs which are always in focus can be taken, but during the release priority mode, an out-of-focus situation still occurs depending on the timing of the release interruption. This out-of-focus is greatest when the release interruption is made at the start of lens driving.

So, in a second embodiment which will hereinafter be described, this out-of-focus situation is reduced by about a half.

The principle of the second embodiment will hereinafter be described with reference to FIG. 13.

The second embodiment is the same as the first embodiment up to the third focus adjusting cycle effected at time $t_3$ In the first embodiment, after the time $t_3$. TM3+TR is estimated as a time-lag and the then position of the object is foreseen, while in the present embodiment, a time-lag of TMC is added thereto and the imaging plane position $f_{r4}$ of the object after TM3+TMC+TR is foreseen and lens driving by an amount of lens driving DL3 is effected. By doing so, the lens arrives at the imaging plane position $l_4$ at a point of time $t_4$ whereat the focus adjusting cycle at $t_3$ is completed, whereafter the fourth focus adjusting cycle is effected and thereafter, similar control is effected, whereupon the lens arrives at $l_5$ at a point of time $t_5$ whereat the fourth focus adjusting cycle is completed. That is, in the first embodiment, the locus l(t) of the lens is always at one side relative to the imaging plane position f'(t) of the lens for bringing it into coincidence with the imaging plane position of the object taking the release time-lag into account, while in the present embodiment, control is effected with l(t) distributed on both sides of f'(t) and therefore, the amount of deviation of the locus of the lens relative to the imaging plane position f'(t) of the lens taking the release time-lag into account becomes one half.

That is, f'(t) in FIGS. 7 and 13 represents the imaging plane position of the lens taking the release time-lag into account, and if the locus l(t) of the lens is always on the line of this f'(t), whenever the releasing operation is performed, photographing with the lens in focus can be accomplished.

Consequently, the amount of deviation between the line f'(t) and the line f(t) at each point of time is the amount of out-of-focus, and the maximum amount of deviation in FIG. 13 is one half of that in FIG. 7.

It is ideal that TMC in FIG. 13 is one half of $t'_4 - t_4 (= t_2 - t'_2)$, and for that purpose, TMC should be found from TM2 and the lens driving time, but may be regarded as a constant value.

As is clear from FIG. 13, the point at which the line f'(t) and the line l(t) coincide with each other is a point of time after TMC from the point of time ($t_4$, $t_5$) at which the focus adjusting cycle is completed, and if the releasing operation is started at this point of time, the lens can always be made in focus. Consequently, in the second embodiment, control is effected in the focus priority mode so that the point of time at which the releasing operation is started is a point of time delayed by TMC from the completion of the focus adjusting cycle.

The operation of the second embodiment will now be described with reference to FIG. 14.

Figure 14:
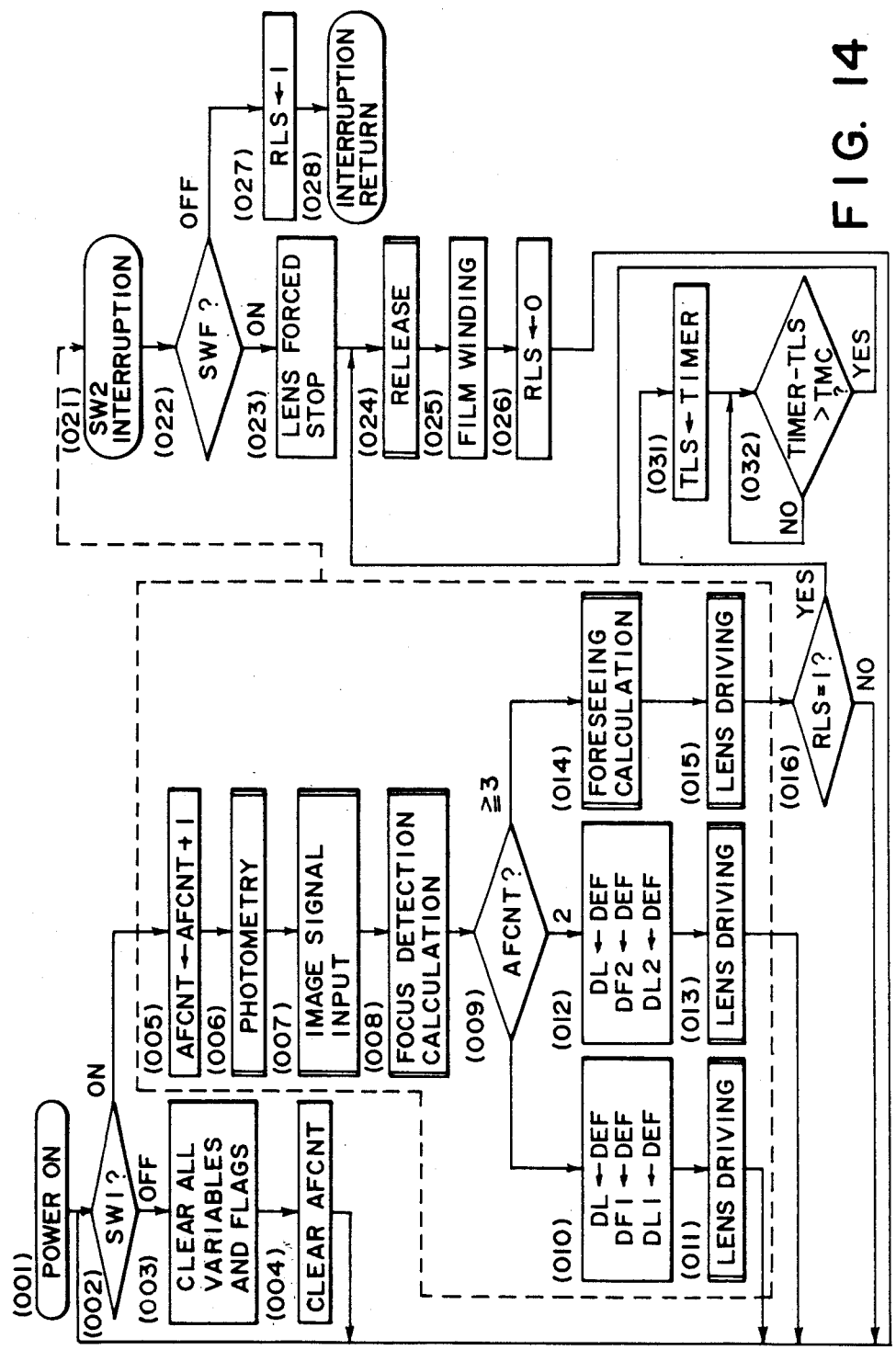
FIG. 14 illustrates a control flow for the lens driving of FIG. 13.

The foreseeing calculation sub-routine of FIG. 14 is executed as the formula of step (310) in FIG. 11, DL←A·[(TM1+TM2+TM3+TMC+TR)$^2$−(TM1+TM2)$^2$ ]+B·(TM3+TMC+TR)+DF3. That is, in the second embodiment, as is clear from FIG. 13, the point of time at which release is started is delayed by TMC from the point of time at which the focus adjusting cycle is completed and therefore, if the time-lag TM3 +TR in the first embodiment is changed to TM3+TR+TMC, the imaging plane position of the lens after driven by the amount of driving found by foreseeing calculation coincides with the imaging plane position of the object when exposure is started in a case where release is started at a point of time delayed by TMC from the point of time at which the focus adjusting cycle has been completed. Consequently, the foreseeing calculation sub-routine of FIG. 14 calculates DL based on the above-mentioned formula.

The flow of FIG. 14 differs from the flow of FIG. 1 only in that the above-mentioned formula of the foreseeing calculation sub-routine partly differs as described above and steps (031) and (032) are added. The reason why the steps (031) and (032) are added is for causing the release sub-routine (024) to be executed in a time TMC after the focus adjusting cycle is completed if in the focus priority mode, the switch SW2 becomes ON.

That is, at step (015), the focus adjusting cycle is completed, whereafter a shift is made to step (031) through step (016). At this step (031), the current time of the self-running timer of the computer PRS is input to a memory TLS, and at step (032), a delay is effected until the difference between the current time of the self-running timer and the time of said memory TLS becomes greater than TMC, and when TIMER-TLS>TMC, the release sub-routine of step (024) is executed.

Thus, as described in connection with FIG. 13, the releasing operaiton is started in TMC after the completion of the focus adjusting cycle, whereby a photograph which is in focus can be taken.

In FIG. 13, the point at which the locus l(t) of the lens and the locus f'(t) of the imaging plane position of the lens coincide with each other is the point $l_{4b}$ during the lens driving, besides the points $l_{4a}$ and $l_{5a}$ which are delayed by TMC after the completion of lens driving. Consequently, if the releasing operation is performed when the lens is at $l_{4a} - l_{4b}$, the lens may be stopped and the releasing operation may be started when the lens has been driven to $l_{4b}$.

We claim:

1. A camera comprising:
   (a) an imaging optical system;
   (b) a focus detecting circuit for repeatedly performing a focus detection operation and outputting a focus signal, representing a focusing state of the optical system, at a time of each of the focus detection operations;

(c) a calculation circuit for performing a foreseeing calculation in which, on the basis of a focus signal detected in the past and the latest focus signal, the focusing state is predicted for a time after the expiration of a predetermined period of time which includes a release time-lag, said predetermined period of time extending from the time at which the latest focus signal was detected by said focus detecting circuit;

(d) a driving circuit including a driving means which drives said imaging optical system by a driving amount corresponding to the focusing state calculated by said claculation circuit;

(e) a release operation member;

(f) releasing means responsive to an operation of said release operation member to cause a film exposure operation to begin; and (g) a release timing control circuit for controlling said releasing means so that it does not operate until a time which is earlier by said release time-lag than the focusing state predicted time.

2. A camera according to claim 1, wherein said timing control circuit permits the operation of said releasing means at a point of time whereat the driving of said imaging optical system is completed.

3. A camera according to claim 1, wherein said timing control circuit permits the operation of said release means at a predetermined time after a point of timer whereat the driving of said imaging optical system is completed.

4. A camera comprising:

(a) an imaging optical system;

(b) a focus detecting circuit for detecting a focus state of said imaging optical system and outputting a focus signal;

(c) a calculation circuit for finding an amount of driving of said imaging optical system for making the imaging optical system in focus to an object after a predetermined period of time including a release time-lag on the basis of a past focus signal output by said focus detecting circuit;

(d) a driving circuit including a driving means for driving said imaging optical system by the amount of driving found by said calculation circuit;

(e) a release operation member;

(f) a releasing means responsive to an operation of said release operation member to cause a film exposure operation to begin; and (g) a controlling means for controlling said releasing means so that it does not operate until a point of time earlier by the release time-lag from the end of said predetermined period of time.

5. A camera according to claim 4, wherein said predetermined period of time includes a calculating time said calculating circuit requires to calculate the amount of driving, and the driving time necessary for driving said imaging optical system by the calculated amount of driving.

6. A camera according to claim 5, wherein said calculation circuit foresees an imaging plane position of an object after said predetermined period of time relative to an imaging plane position of the object with respect to a current position of the imaging optical system, and finds the amount of driving required for bringing the foreseen position and the imaging plane position of the imaging optical system into coincidence with each other.

7. A camera comprising:

(a) an imaging optical system;

(b) a focus detecting circuit for repeatedly performing a focus detection operation and outputting a focus signal, representing a focusing state of said optical system, at a time of each focus detection operation;

(c) a calculation circuit for calculating an optical system driving amount to make an object in-focus at a point of time which is determined by adding (1) a release time-lag, (2) the time required for a focus detecting operation, and (3) the time required for the lens driving operation, to a point of time at which a latest operation for obtaining the focus signal was started by said focus detecting circuit;

(d) a driving circuit including a driving means which drives the imaging optical system by a driving amount determined by said calculation circuit;

(e) a release operation member;

(f) releasing means responsive to an operaiton of said release operation member for causing an exposure operation to begin; and (g) a release timing control circuit for causing said releasing means to not respond to the operation of said release operation member until a point of time which is determined by adding the focus detecting operation time and the lens driving operation time to the point of time at which the operation for detecting the latest focusing signal is started.

8. A camera provided with an automatic focusing adjusting apparatus alternately repeating an operation of (1) a focus detecting operation and (2) a lens driving operation conforming to a focus signal found by said focus detection operation, said camera including:

(a) a calculation circuit for finding a defocus amount at a particular point of time after a predetermined period of time, which includes release time-lag, from a time when a latest focus detecting operation is performing on the basis of past focus signals determined by said automatic focus adjusting apparatus;

(b) a lens driving circuit for effecting the lens driving operation in conformity with the defocus amount found by said claculation circuit;

(c) a release operating member;

(d) a release means for performing a releasing operation in response to the operation of said release operating member; and (e) an inhibiting means for inhibiting the response to said release means to the operation of said release operating member until a point of time at which said defocus amount becomes smallest when the release operating member is operated during a focus adjusting operation.

9. A camera according to claim 8, wherein said calculation circuit finds an amount of lens driving for making the lens in focus to the object at the particular point of time.

10. A camera according to claim 8, wherein said inhibiting means inhibits the response of said release means to the operation of the release operating member until at a point of time earlier by the release time-lag from said particular point of time.

* * * * *

UNITED STATES PATENT AND TRADEMARK OFFICE
CERTIFICATE OF CORRECTION

PATENT NO. : 4,972,221

DATED : November 20, 1990

INVENTOR(S) : Ichiro OHNUKI, ET AL.

It is certified that error appears in the above-identified patent and that said Letters Patent is hereby corrected as shown below:

COLUMN 1:

Line 9, "Rekated" should --Related--;

Line 12, "pursued by" should read --pursued, by--;

Line 32, "operation an" should read --operation, an--; and

Line 45, "broken line means" should read --the broken line represents--.

COLUMN 2:

Line 59 "amount" should read --amounts--;

Line 63, "(8)" should read --(8')--; and

Line 64, "$(TM_{n-2} + TM_{n-2}) TM_{n-1}$" should read --$(TM_{n-2} + TM_{n-1}) TM_{n-1}$--.

UNITED STATES PATENT AND TRADEMARK OFFICE
CERTIFICATE OF CORRECTION

PATENT NO. : 4,972,221  Page 2 of 8
DATED : November 20, 1991
INVENTOR(S) : Ichiro OHNUKI, ET AL.

It is certified that error appears in the above-identified patent and that said Letters Patent is hereby corrected as shown below:

COLUMN 3:

Line 27, "intactly" should be deleted;

Line 34, "$1'_{r1}$ 1" should read --$1'_{r1}$--;

Line 38, "An" should read --As--;

Line 39, "in such control that" should read --when the--; and

Line 68, "out-of-focus" should read --an out-of-focus situation--

COLUMN 4:

Line 4, "operation an, should read --operation, an--; and

Line 9, "during state" should read --state during--.

COLUMN 5:

Line 8, "DL2 the" should read --DL2, the--; and

UNITED STATES PATENT AND TRADEMARK OFFICE
CERTIFICATE OF CORRECTION

PATENT NO. : 4,972,221
DATED : November 20, 1990
INVENTOR(S) : Ichiro OHNUKI, ET AL.

It is certified that error appears in the above-identified patent and that said Letters Patent is hereby corrected as shown below:

Line 20, "imaging plane positions $f_{r4}, f_5...$ should read --imaging plane positions $f_{r4}, f_{r5}...$--; and Line 34, "imaging plane positions $f_{r4}, f_5...$ should read --imaging plane positions $f_{r4}, f_{r5}...$--;

COLUMN 6:

Line 65, "be" (first occurrence) should be deleted.

COLUMN 7:

Line 48, "in" should read --with--.
Line 48, after not "with" should be deleted.

COLUMN 8:

Line 8, "shift" should read --a shift--;

Line 9, "a" should be deleted;

Line 47, "intactly" should be deleted; and

Line 58, "forseeing should read --the forseeing--.

UNITED STATES PATENT AND TRADEMARK OFFICE
CERTIFICATE OF CORRECTION

PATENT NO. : 4,972,221

DATED : November 20, 1990

INVENTOR(S) : Ichiro OHNUKI, ET AL.

It is certified that error appears in the above-identified patent and that said Letters Patent is hereby corrected as shown below:

COLUMN 9:

Line 3, "The to" should read --The switch $SW2$, as previously described, is connected to--;

Line 5, "made" should be deleted; and

Line 41, "given" should read --given of--.

COLUMN 10

Line 17, "operaiton (024) should read --operation (024)--; and

Line 47, "TM1 $\rightarrow$ TN-TN1" should read --TM1 $\leftarrow$ TN-TN1--.

COLUMN 11:

Line 57, "into" should read --in--; and

Line 59, "CCD driving clocks $\phi 1$ and $\phi 2$" should read --CCD driving clocks $\phi 1$ and $\phi 2$--.

COLUMN 12:

Line 25, delete "to the focus adjusted;

UNITED STATES PATENT AND TRADEMARK OFFICE
CERTIFICATE OF CORRECTION

PATENT NO. : 4,972,221

DATED : November 20, 1990

INVENTOR(S) : Ichiro OHNUKI, ET AL.

It is certified that error appears in the above-identified patent and that said Letters Patent is hereby corrected as shown below:

Line 39, ""completed a" should read
        --completed, a--; and

Line 49, "of forseeing" should read --of the
        forseeing--.

COLUMN 13:

Line 61, "claculation" should read
        --calculation--.

COLUMN 14:

Line 24, "standly" should read --standby--;

Line 58, "A" should read --If a--; and

Line 61, "selected a" should read
        --selected, a--.

UNITED STATES PATENT AND TRADEMARK OFFICE
CERTIFICATE OF CORRECTION

PATENT NO. : 4,972,221

DATED : November 20, 1990

INVENTOR(S) : Ichiro OHNUKI, ET AL.

It is certified that error appears in the above-identified patent and that said Letters Patent is hereby corrected as shown below:

COLUMN 15:

Line 9, "of forseeing" should read --of the forseeing--;

Line 10, "whereas" should read --whereat--;

Line 19, "out-of-focus" should read --out-of-focus situation--; and

Line 29, "time $t_3$ In" should read --time $t_3$.  In--.

COLUMN 16:

Line 21, "driven" should read --being driven--; and

Line 22, "foreseeing" should read --the foreseeing--; and

Line 48, "operaiton" should read --operation--.

UNITED STATES PATENT AND TRADEMARK OFFICE
CERTIFICATE OF CORRECTION

PATENT NO. : 4,972,221

DATED : November 20, 1990

INVENTOR(S) : Ichiro OHNUKI, ET AL.

It is certified that error appears in the above-identified patent and that said Letters Patent is hereby corrected as shown below:

COLUMN 17:

Line 13, "claculation" should read --calculation--;

Line 28, "timer" should read --time--; and

Line 60, "claim 5" should read --claim 4,--.

COLUMN 18:

Line 22, "operaiton" should read --operation--;

Line 36, "detection" should read --detecting--;

Line 39, "release time-lag," should read --a release time-lag--;

Line 46, "claculation" should read --calculation-- and

UNITED STATES PATENT AND TRADEMARK OFFICE
CERTIFICATE OF CORRECTION

PATENT NO. : 4,972,221

DATED : November 20, 1990

INVENTOR(S) : Ichiro Ohnuki, et al

It is certified that error appears in the above-identified patent and that said Letters Patent is hereby corrected as shown below:

Column 18, line 51, "to" should read --of--.

Signed and Sealed this

Thirteenth Day of August, 1991

*Attest:*

HARRY F. MANBECK, JR.

*Attesting Officer*  *Commissioner of Patents and Trademarks*